Patented Feb. 23, 1954

2,670,424

UNITED STATES PATENT OFFICE 2,670,424

METHOD OF ELECTRIC ARC WELDING OF METAL OR ALLOY STUDS AND THE LIKE TO METAL OR ALLOY PLATES AND THE LIKE

Harold Martin, East Molesey, England

No Drawing. Application May 26, 1950, Serial No. 164,606. In Great Britain November 10, 1942

Section 1, Public Law 690, August 8, 1946
Patent expires November 10, 1962

5 Claims. (Cl. 219—10)

This application is a continuation in part of the application, Serial No. 766,480, filed on August 5, 1947, now abandoned and claiming a date of priority, November 10, 1942, on the basis of the applications in Great Britain No. 15,888/42 and No. 14,975/44.

The invention relates to a method for the electric arc welding of objects in the form of metal or alloy studs, tubes, rods, rivets and the like (hereinafter termed "studs") to surfaces in the form of metal or alloy plates, bodies and the like (hereinafter termed "plates"), and more particularly to the welding of steel or steel alloy studs to steel or steel alloy plates and comprises an improvement in a method of electric arc welding of studs to plates, wherein the stud to be welded is set in conductive relation to the plate to which it is to be welded, a welding current is passed through the stud and the plate, an arc is formed between the stud and the plate by withdrawing the stud from contact with the plate or by fusing an axial extension of small cross-sectional area of the welding end of the stud, according to the formation of the welding end of the stud, and the arc is maintained for a predetermined period, to enable the welding end of the stud and the crater formed in the surface of the plate to acquire welding temperatures, whereupon the heated stud is moved into contact with the crater of the plate to complete the weld, the flow of current in the welding circuit being maintained as long as is necessary to secure a satisfactory weld.

In the application of this method to the welding of steel studs to steel plates, more particularly when using an alternating current supply for the welding circuit, it was not possible to ensure satisfactory welds by reason of uncertainty in the formation of the arc and a tendency for the arc to wander out of the axial line of the stud, with a consequent frequent lack of concentricity of the fillet of previously molten metal formed about the weld, even when the plate was set in the horizontal plane.

The invention has among its objects, more particularly in steel and ferrous alloy welding by the use of direct current or alternating current supplies, to facilitate the striking of the arc, to secure instantaneous, unhesitant, uniform and smooth formation of the arc, more particularly in the use of an alternating current supply, to reduce the tendency for the arc to wander and generally to improve the weld.

A method of stud welding has been proposed in which the stud is set spaced from the plate a distance equal to the required length of the arc, so that there is no conductive relation, and reliance is placed upon the presence in the gap of a small quantity of coarse granular arc-initiating material, consisting of a loose intermixture of two parts of steel chippings and one part of aluminium filings, of a size larger than will pass through a No. 8 mesh screen, for the striking of the arc. The arc-initiating material is moved to short circuit the gap between the stud and the plate immediately the welding circuit is closed, by reason of the flux set up in the arc space by the potential across the gap. The material, of which about 150 milligrams suffices for a half-inch stud, is either placed on the plate or caused to adhere to the welding end of the stud by means of glue, glycerine, or other adhesive.

It is also known, in connection with covered electrodes for arc welding along line junctions, to avoid the necessity for breaking away the insulating covering in order to bare the metal core so that an arc may be struck, by fitting a conductive covering cap after the end of the core has been bared and smooth-ground, so that the cap and the metal core contact intimately. In use, the cap can be applied to the work and, upon the closing of the welding circuit, the cap bridges the insulating covering and permits the arc to be struck forthwith. The cap may be formed in various ways. Thus, it may be formed by dipping or spraying the end of the electrode with a drying suspension of graphite, carbon, soot or fine particles of metal or sprayed coatings of pure copper, silver or aluminium may be used and give good contact.

According to the invention the electric arc welding of objects such as those hereinbefore defined to the surfaces of plates, and more particularly steel or steel alloy studs to steel or steel alloy plates is effected by an improved method consisting in preparing the welding end of the stud to the form required, metallizing the surface of the welding end of the stud with a metal or alloy of higher conductivity than that of the material of the stud, and thereby uniting the metallizing material with the material of the stud, setting the stud in conductive relation to the plate to which it is to be welded, forming the arc either by withdrawing the stud to the required arc length from the plate or fusing a projection of the stud that is in contact with the plate either directly or through a fusible pellet or mass, the stud being either retained without movement or withdrawn to the full arc distance, maintaining the arc for a predetermined period to permit the welding end of the stud and the crater formed in the surface of the plate to acquire welding temperatures and then moving the heated welding end of the stud into contact with the crater of the plate, the flow of current in the welding circuit being maintained as long as is necessary for the formation of a satisfactory weld.

It is preferred to use aluminium for metallizing the welding end of the stud, but other metals or alloys having the required characteristics may be used and may be selected in dependance upon the metal or alloy of which the stud is made. Thus, in certain instances, a copper alloy of suitable properties and composition may be used. For steel or steel alloy studs, for instance, suitable alloys that may be used include ferro-titanium and ferro-manganese.

The metallization of the welding end of the stud is effected by means of a spraying pistol operated according to a recognised metallization process, such as the Schori or Schoop processes. In such processes, the metal to be applied is fed to the pistol, in the form of powder or in the form of wire, for example, and is there subjected to a blow-pipe flame of high temperature, whereby it is rendered molten, and is thence projected in atomized form by a high pressure blast of air or gas to the surface to be coated. In another of such processes the metal is melted in a container within the pistol and is projected from the pistol by a blast of high pressure air. It is preferred to use the metal in the form of wire. By such processes the metal or alloy used as the metallizing material arrives upon the surface to be coated in the molten and atomised state and becomes intimately united or bonded with the metal or alloy of the stud and is entirely free of suspension media or adhesives.

It is necessary that the surface to be metallized shall be prepared for the purpose by sand or grit blasting immediately before metallization takes place.

The metallization of the welding end of the stud is of advantage in securing the striking of the arc with certainty and in a smooth and unhesitant manner and in improving the welds in any method of electric arc stud welding, and more particularly in the method in which the stud is withdrawn from the surface to which it is to be welded to the determined arc length in order to strike the arc, and is also of use in the case where the arc is struck by setting the stud at the full arc distance from the plate and bridging the gap, to secure conductive relation, by means of an axial extension of the stud or by means of a fusible mass, such as a mass of fibrous metallic material. The advantages are secured in the use of direct current welding supplies and especially in the use of alternating current supplies.

The welding end of the stud advantageously may be coned slightly to an angle of, for example, 120°, and the adjacent part of the stud over a distance of, for example, a quarter of an inch may be retained smooth and unthreaded. The point of the stud should be smooth and without burrs and the whole of the coned surface should be metallized. Where an axial extension of the stud is provided, it should be of small cross-sectional area and may be associated with a coned or plane welding end. The extension or pip should also be metallized.

In carrying the invention into effect, by way of example, in the welding of a steel stud to a steel plate, the stud, after being metallized over the coned welding end, is mounted in the chuck or holder of the welding apparatus and is contacted with the plate at the position at which it is to be welded. The welding circuit is then closed, so that current flows through the stud and the plate. The stud is withdrawn from the plate to the distance representing the determined arc length so that the arc is struck. The arc is maintained for the predetermined period necessary to ensure the required welding conditions of the welding end of the stud and the crater formed in the plate, whereupon the stud is moved into contact with the crater with a minimum of impact, to avoid disturbance of the molten metal present, the flow of current in the welding circuit being continued as long as necessary to secure an effective weld. Such method of welding is especially suited to a direct current source of welding supply, but is also of use with alternating current. It is, however, preferred, in the latter case, to set and retain the stud at the arc distance from the plate, or nearly so, and to bridge the gap, so that conductive relation is established, by means of a fusible mass, such as a ball of fibrous metallic material. The arc is then struck by the fusion of the mass and after the determined duration of the arc the stud is moved to the plate. When an axial extension, metal pin or short length of small metal tube is carried by the end of the stud, contact may be directly made with the plate or it may be effected with the interposition of a fusible mass as hereinbefore defined.

In the welding of tubes or other hollow objects, the bore or hollow may be plugged or bridged before metallization of the welding end and the plug or bridge may carry a point or extension or be coned.

It will be understood that no limitation is involved as to the specific metallizing materials hereinbefore defined. Thus, alternative to the alloys hereinbefore mentioned for use with steel or steel alloy studs, the metals titanium, manganese and vanadium may be used with good effect.

The metallization of the stud in the manner hereinbefore described has desirable effects in that, for example, the grain of the metal at the weld junction is improved and strength and toughness of the metal of the weld are increased.

The fact that the metallizing material is intimately bonded or united to the metal of the stud ensures the protection of the welding and of the stud against corrosion by atmospheric or climatic conditions and that the metallized coating is not subject to damage in transport or storage.

The use of aluminium is advantageous in that deoxidation in the arc gap is secured and nitrogenous contamination in the weld metal is avoided. The other metals defined produce similar effects.

I claim:

1. A method of end-welding metallic objects to metallic surfaces by electric arc welding, comprising establishing conducting relation between one end of a metallic object having such end completely metallized with a metallic material of higher electrical conductivity than that of the object and selected from the group consisting of aluminum, titanium, vanadium and manganese and their alloys, and the surface to which it is to be welded, passing welding current through the object and the surface and forming an arc between them, maintaining the arc for a predetermined period so that the welding end of the object and the crater formed in the surface may acquire welding temperatures, and moving the heated object into contact with the crater in the surface, the flow of current in the welding circuit through the object and the surface being maintained as long as necessary to secure a satisfactory weld.

2. A method according to claim 1, in which the arc is established by separating the object from the surface after the welding current has been applied.

3. A method according to claim 1, in which the arc is established by the passage of the current through a part of the object of reduced cross-sectional area at the welding end of the object in conductive relation with the surface.

4. A method of end-welding metallic objects to metallic surfaces by electric arc welding, comprising establishing conducting relation between one end of a metallic object having such end completely metallized with aluminum and the surface to which it is to be welded, passing welding current through the object and the surface and forming an arc between them, maintaining the arc for a predetermined period so that the welding end of the object and the crater formed in the surface may acquire welding temperatures, and moving the heated object into contact with the crater in the surface, the flow of current in the welding circuit through the object and the surface being maintained as long as necessary to secure a satisfactory weld.

5. A method according to claim 1, in which such end of the object is conical.

HAROLD MARTIN.

References Cited in the file of this patent

UNITED STATES PATENTS

| Number | Name | Date |
|---|---|---|
| 2,096,495 | Hogg | Oct. 19, 1937 |
| 2,260,969 | Crecca et al. | Oct. 28, 1941 |
| 2,315,502 | Crecca et al. | Apr. 6, 1943 |
| 2,441,257 | Candy | May 11, 1948 |
| 2,462,882 | Martin | Mar. 1, 1949 |

FOREIGN PATENTS

| Number | Country | Date |
|---|---|---|
| 497,133 | Great Britain | Dec. 13, 1938 |
| 501,721 | Great Britain | Mar. 3, 1939 |